United States Patent
Maru et al.

(10) Patent No.: US 12,237,499 B2
(45) Date of Patent: Feb. 25, 2025

(54) NEGATIVE ELECTRODE MATERIAL FOR NONAQUEOUS SECONDARY BATTERIES, NEGATIVE ELECTRODE FOR NONAQUEOUS SECONDARY BATTERIES, AND NONAQUEOUS SECONDARY BATTERY

(71) Applicant: Mitsubishi Chemical Corporation, Tokyo (JP)

(72) Inventors: Naoto Maru, Tokyo (JP); Shunsuke Yamada, Tokyo (JP); Hisako Kondo, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 806 days.

(21) Appl. No.: 17/091,208

(22) Filed: Nov. 6, 2020

(65) Prior Publication Data

US 2021/0057730 A1 Feb. 25, 2021

Related U.S. Application Data

(63) Continuation of application No. PCT/JP2019/019872, filed on May 20, 2019.

(30) Foreign Application Priority Data

May 22, 2018 (JP) .................................. 2018-098022

(51) Int. Cl.
*H01M 4/36* (2006.01)
*H01M 4/02* (2006.01)
*H01M 4/48* (2010.01)
*H01M 4/587* (2010.01)
*H01M 10/0525* (2010.01)

(52) U.S. Cl.
CPC ........... *H01M 4/364* (2013.01); *H01M 4/483* (2013.01); *H01M 4/587* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| 8,974,966 B2 | 3/2015 | Kim et al. |
| 2009/0104519 A1 | 4/2009 | Kim et al. |
| 2011/0159368 A1 | 6/2011 | Hirose et al. |
| 2015/0194668 A1 | 7/2015 | Ueda et al. |

FOREIGN PATENT DOCUMENTS

| CN | 101330139 A | 12/2008 | |
| CN | 102110853 A | 6/2011 | |
| JP | 2004047404 A | * 2/2004 | ............ B82Y 30/00 |
| JP | 2007-242282 A | 9/2007 | |
| JP | 2009-4139 A | 1/2009 | |
| JP | 2009-105046 A | 5/2009 | |
| JP | 2011-233497 A | 11/2011 | |
| JP | 2013-200983 A | 10/2013 | |
| JP | 2015-38862 A | 2/2015 | |
| JP | 2015-69762 A | 4/2015 | |
| JP | 2017-4727 A | 1/2017 | |
| JP | 2017-16944 A | 1/2017 | |
| JP | 2018-55952 A | 4/2018 | |
| JP | 2018-88406 A | 6/2018 | |
| KR | 10-2011-0112216 A | 10/2011 | |
| WO | WO 2018/097213 A1 | 5/2018 | |

OTHER PUBLICATIONS

JP2004047404A—machine translation (Year: 2004).*
International Search Report issued Jul. 2, 2019 in PCT/JP2019/019872 filed May 20, 2019, citing documents AA and AN-AS therein, 2 pages.
Japanese Office Action issued on Mar. 7, 2023 in Japanese Patent Application No. 2020-521218, with unedited computer-generated English translation, 10 pages.
Extended European Search Report issued May 21, 2021 in European Patent Application No. 19807999.8, citing document AO therein, 12 pages.
Combined Chinese Office Action and Search Report issued Jan. 26, 2024, in corresponding Chinese Patent Application No. 201980032607.9 (with English Translation and English Translation of Category of Cited Documents) citing documents 15-18 therein, 16 pages.
Korean Office Action issued on Jul. 25, 2024, in Korean Patent Application No. 10-2020-7031815, with Machine English Translation, 14 pages, citing 15.
Combined Chinese Office Action and Search Report issued Oct. 31, 2024, in corresponding Chinese Patent Application No. 201980032607.9 (with English Translation), 15 pages.

* cited by examiner

*Primary Examiner* — Haroon S. Sheikh
(74) *Attorney, Agent, or Firm* — Oblon, McClelland, Maier & Neustadt, L.L.P.

(57) ABSTRACT

A negative electrode material for nonaqueous secondary batteries, the negative electrode material comprising carbonaceous particles (A) and silicon oxide particles (B), the carbonaceous particles (A) having a 10%-particle size displacement pressure of 10 MPa or less, the 10%-particle size displacement pressure being measured using a micro-compression testing machine by a specific measuring method, the silicon oxide particles (B) having a median diameter (D50) of 0.8 μm or more and 20 μm or less. It is preferred that the content of the silicon oxide particles (B) is less than 30% by weight of a total content of the carbonaceous particles (A) and the silicon oxide particles (B).

10 Claims, No Drawings

NEGATIVE ELECTRODE MATERIAL FOR NONAQUEOUS SECONDARY BATTERIES, NEGATIVE ELECTRODE FOR NONAQUEOUS SECONDARY BATTERIES, AND NONAQUEOUS SECONDARY BATTERY

TECHNICAL FIELD

The present invention relates to a negative electrode material for nonaqueous secondary batteries, a negative electrode for nonaqueous secondary batteries which includes the negative electrode material, and a nonaqueous secondary battery including the negative electrode.

BACKGROUND ART

There has been a growing demand for large-capacity secondary batteries with reductions in the sizes of electronic devices. Particular attention has been given to nonaqueous secondary batteries and, in particular, lithium-ion secondary batteries, which have higher energy densities and better quick charge-discharge characteristics than nickel-cadmium batteries or nickel-hydrogen batteries. Specifically, nonaqueous lithium secondary batteries that include positive and negative electrodes capable of occluding and releasing lithium ions and a nonaqueous electrolyte solution containing a lithium salt, such as $LiPF_6$ or $LiBF_4$, dissolved therein have been developed and used.

Various types of negative electrode materials have been proposed as a negative electrode material for nonaqueous lithium secondary batteries. Particles of graphite carbonaceous materials, such as natural graphite, artificial graphite produced by the graphitization of coke or the like, graphitized mesophase pitch, and graphitized carbon fibers, have been used as a negative electrode material for nonaqueous lithium secondary batteries because, for example, they have a large capacity and enhance the flatness of discharge potential. Amorphous carbon materials have been also used because, for example, they are relatively stable toward particular electrolyte solutions. A carbon material produced by covering the surfaces of graphite particles with amorphous carbon or attaching amorphous carbon onto the surfaces of graphite particles in order to achieve two properties, that is, the property of graphite to have a large capacity and reduce irreversible capacity and the property of amorphous carbon to enhance stability toward electrolyte solutions, has been also used.

Attempts have been made to use a metal or metal oxide capable of forming an alloy with lithium as a negative electrode material in order to further increase the capacities of lithium-ion secondary batteries. It is known that a metal or metal oxide capable of forming an alloy with lithium may cause battery degradation because the volume of such a negative electrode material significantly changes during charging and discharging. In order to address this issue, there has been a study of using a carbon material having specific properties in combination with a metal or metal oxide capable of forming an alloy with lithium.

In PTLs 1 and 2, a combination of a carbonaceous material having a specific electrode pressing load and composite carbon particles including silicon is described.

In PTL 3, a combination of graphite particles capable of forming pellets having a specific density at a specific pressure and metal-carbon composite active material particles is described.

In PTL 4, a negative electrode active material that includes a silicon active material (SiOx: 0.5≤x≤1.6) and a carbon active material, wherein the proportion of the mass of the silicon active material to the total mass of the negative electrode active material is 1% by mass or more and 25% by mass or less, is described.

In PTL 5, a combination of carbonaceous particles including graphite particles and a carbon layer disposed on at least a part of the surfaces of the graphite particles and silicon oxide particles is described.

PTL 1: JP 2015-38862 A
PTL 2: JP 2015-69762 A
PTL 3: JP 2009-105046 A
PTL 4: JP 2017-4727 A
PTL 5: JP 2013-200983 A

The inventor of the present invention conducted detailed studies of the related art above and consequently found that the balance between the capacities and cycle characteristics of batteries prepared using the negative electrode materials described in PTLs 1 to 5 is not at a sufficient level.

SUMMARY OF INVENTION

It is an object of the present invention to provide a negative electrode material for nonaqueous secondary batteries with which a battery excellent in terms of balance between capacity and cycle characteristics may be produced and a negative electrode for nonaqueous secondary batteries and a nonaqueous secondary battery which are produced using the negative electrode material.

The inventor of the present invention found that the above object may be achieved by using a negative electrode material for nonaqueous secondary batteries which includes carbonaceous particles having a specific compressive strength and silicon oxide particles having a specific particle size in a combined manner.

The summary of the present invention is as follows.

[1] A negative electrode material for nonaqueous secondary batteries, the negative electrode material comprising carbonaceous particles (A) and silicon oxide particles (B), the carbonaceous particles (A) having a 10%-particle size displacement pressure of 10 MPa or less, the 10%-particle size displacement pressure being measured using a microcompression testing machine by a measuring method below, the silicon oxide particles (B) having a median diameter (D50) of 0.8 μm or more and 20 μm or less.

<Method for Measuring 10%-Particle Size Displacement Pressure>

A sample is placed on a sample stage of a microcompression testing machine. A carbonaceous particle that is to be measured is randomly selected using a microscope attached to the machine. An average diameter of the particle that is to be measured is calculated as an average of a maximum diameter of the particle which is measured when the particle is viewed in plan with the microscope and a local maximum diameter of the particle which is measured in a direction orthogonal to an axis along which the maximum diameter occurs. Subsequently, a compression test is conducted with a maximum testing force of 490 mN and a loading rate of 4.8 mN/sec. A testing force at which a displacement (deformation) of the particle reaches 10% of the average diameter is substituted into Formula (1) below in order to calculate a 10%-particle size displacement pressure. Four or more carbonaceous particles are subjected to the above measurement. An average of measurement results of the bottom 50% of a distribution of the 10%-particle size displacement pressure is considered a 10%-particle size displacement pressure of the sample.

$$\{10\%\text{-Particle size displacement pressure}\}=2.48\times\{\text{Testing force [N]}\}/(\pi\times\{\text{Average diameter [µm]}\}\times\{\text{Average diameter [µm]}\}) \qquad \text{Formula (1)}$$

[2] The negative electrode material for nonaqueous secondary batteries according to [1], the negative electrode material including artificial graphite as the carbonaceous particles (A).

[3] The negative electrode material for nonaqueous secondary batteries according to [1], the negative electrode material including granular artificial graphite as the carbonaceous particles (A).

[4] The negative electrode material for nonaqueous secondary batteries according to any one of [1] to [3], wherein a content of the silicon oxide particles (B) is less than 30% by weight of a total content of the carbonaceous particles (A) and the silicon oxide particles (B).

[5] The negative electrode material for nonaqueous secondary batteries according to any one of [1] to [4], wherein the carbonaceous particles (A) are graphite particles.

[6] The negative electrode material for nonaqueous secondary batteries according to any one of [1] to [5], wherein the silicon oxide particles (B) have a structure including a microcrystal of silicon.

[7] The negative electrode material for nonaqueous secondary batteries according to any one of [1] to [6], wherein the silicon oxide particles (B) are represented by general formula SiOx (0.5≤x≤1.6).

[8] The negative electrode material for nonaqueous secondary batteries according to any one of [1] to [7], wherein the silicon oxide particles (B) are not included in graphite.

[9] A negative electrode for nonaqueous secondary batteries, the negative electrode comprising a current collector and an active material layer disposed on the current collector, the active material layer including the negative electrode material according to any one of [1] to [8].

[10] A nonaqueous secondary battery comprising a positive electrode, a negative electrode, and an electrolyte, the negative electrode being the negative electrode for nonaqueous secondary batteries according to [9].

Advantageous Effects of Invention

The present invention provides a negative electrode material for nonaqueous secondary batteries with which a battery excellent in terms of, for example, balance between capacity and cycle characteristics may be produced and a negative electrode for nonaqueous secondary batteries and a nonaqueous secondary battery which are produced using the negative electrode material.

DESCRIPTION OF EMBODIMENTS

The present invention is described in detail below. The present invention is not limited by the following description. Various modifications may be made without departing from the spirit and scope of the present invention.

In the present invention, when a range is expressed using two numerical values or two physical properties with "to" interposed therebetween, the two numerical values or two physical properties before and after "to" are included in the range.

{Negative Electrode Material}

A negative electrode material for nonaqueous secondary batteries according to the present invention (hereinafter, this negative electrode material may be referred to as "negative electrode material according to the present invention") includes carbonaceous particles (A) and silicon oxide particles (B). The 10%-particle size displacement pressure of the carbonaceous particles (A) which is measured using a micro-compression testing machine by the measuring method described below (hereinafter, this pressure is referred to simply as "10%-particle size displacement pressure") is 10 MPa or less. The median diameter (D50) of the silicon oxide particles (B) is 0.8 µm or more and 20 µm or less.

<Method for Measuring 10%-Particle Size Displacement Pressure>

A sample is placed on a sample stage of a micro-compression testing machine. A carbonaceous particle that is to be measured is randomly selected using a microscope attached to the machine. An average diameter of the particle that is to be measured is calculated as an average of a maximum diameter of the particle which is measured when the particle is viewed in plan with the microscope and a local maximum diameter of the particle which is measured in a direction orthogonal to an axis along which the maximum diameter occurs. Subsequently, a compression test is conducted with a maximum testing force of 490 mN and a loading rate of 4.8 mN/sec. A testing force at which a displacement (deformation) of the particle reaches 10% of the average diameter is substituted into Formula (1) below in order to calculate a 10%-particle size displacement pressure. Four or more carbonaceous particles are subjected to the above measurement. An average of measurement results of the bottom 50% of a distribution of the 10%-particle size displacement pressure is considered a 10%-particle size displacement pressure of the sample.

$$\{10\%\text{-Particle size displacement pressure}\}=2.48\times\{\text{Testing force [N]}\}/(\pi\times\{\text{Average diameter [µm]}\}\times\{\text{Average diameter [µm]}\}) \qquad \text{Formula (1)}$$

Hereinafter, the carbonaceous particles (A) included in the negative electrode material according to the present invention, which have a 10%-particle size displacement pressure of 10 MPa or less, may be referred to as "carbonaceous particles (A) according to the present invention", and the silicon oxide particles (B), which have a median diameter (D50) of 0.8 µm or more and 20 µm or less, may be referred to as "silicon oxide particles (B) according to the present invention".

The silicon oxide particles (B) according to the present invention are not composite particles prepared by combining silicon atoms with a carbon material, such as graphite, as described in PTLs 1 to 3, but are particles composed primarily of SiOx. The content of SiOx in the silicon oxide particles (B) is preferably 70% by weight or more. The silicon oxide particles (B) according to the present invention may include an element other than Si as long as the silicon oxide particles (B) are composed primarily of SiOx. The silicon oxide particles (B) according to the present invention may be silicon oxide particles provided with an amorphous carbon coating deposited on the surfaces, which are described below.

[Mechanisms]

<Effects of Including Silicon Oxide Particles (B) having Median Diameter (D50) of 0.8 µm or More and 20 µm or Less>

The negative electrode material according to the present invention includes the silicon oxide particles (B). This enables the negative electrode material to have a large capacity. Furthermore, since the silicon oxide particles (B) have a median diameter (D50) of 0.8 µm or more and 20 µm or less, a negative electrode material having a small capacity loss due to surface oxidation and excellent cycle characteristics may be produced.

<Effects of Blending Carbonaceous Particles (A) having 10%-Particle Size Displacement Pressure of 10 MPa or Less With Silicon Oxide Particles (B)>

The negative electrode material according to the present invention includes the carbonaceous particles (A) having a 10%-particle size displacement pressure of 10 MPa or less, that is, having a small compressive strength, in addition to the silicon oxide particles (B) having a median diameter (D50) of 0.8 μm or more and 20 μm or less, which are not combined with a carbon material. This enables the formation of an electrode that includes an electrode layer constituted by the carbonaceous particles (A) and the silicon oxide particles (B), the electrode layer having appropriate gaps formed therein. This enables the silicon oxide particles (B) having a large capacity to be fed with a sufficient amount of electrolyte solution during the charge-discharge reaction of a battery. Thus, a battery prepared using the negative electrode material may have a large capacity and excellent cycle characteristics.

Moreover, it becomes possible to address great changes in the volume of the silicon oxide particles (B) which occur during charging and discharging by the carbonaceous particles (A), which are adjacent to the silicon oxide particles (B) and have a small compressive strength, changing the shapes thereof. Consequently, the degradation of the negative electrode may be reduced. Also for the above reason, it is considered that a battery prepared using the negative electrode material has a large capacity and excellent cycle characteristics.

[Carbonaceous Particles (A)]

The carbonaceous particles (A) according to the present invention have a 10%-particle size displacement pressure of 10 MPa or less. The 10%-particle size displacement pressure of the carbonaceous particles (A) according to the present invention is not limited as long as it is 10 MPa or less. In order to maintain the excellent performance even during quick charge-discharge cycles, the 10%-particle size displacement pressure of the carbonaceous particles (A) according to the present invention is preferably 8 MPa or less and is particularly preferably 7 MPa or less. The 10%-particle size displacement pressure of the carbonaceous particles (A) according to the present invention is preferably 0.5 MPa or more, because carbonaceous particles having an excessively low 10%-particle size displacement pressure are likely to have low particle durability.

The carbonaceous particles (A) according to the present invention may be any carbonaceous particles having a 10%-particle size displacement pressure of 10 MPa or less. Examples of the carbonaceous particles (A) include particles of graphite, amorphous carbon, and a carbonaceous substance with a low degree of graphitization.

Among these, graphite particles are preferably used as carbonaceous particles (A) according to the present invention, because they are readily available from commercial sources, theoretically have a large charge-discharge capacity of 372 mAh/g, and improve charge-discharge characteristics at high current densities more effectively than other negative electrode active materials.

Graphite that does not include a large amount of impurities is preferable. Various known refining treatments may optionally be performed as needed. Examples of types of graphite include natural graphite and artificial graphite. Natural graphite is preferable because it enhances the cycle characteristics of a battery prepared using the negative electrode material. On the other hand, in order to increase the capacity of the battery, artificial graphite is preferable and granular artificial graphite is more preferable. The term "granular artificial graphite" used herein refers to artificial graphite particles formed as a result of primary particles of artificial graphite aggregating or combining with one another to form secondary particles. As described below, in order to enhance the characteristics of the battery in a comprehensive manner, spherical natural graphite and granular artificial graphite are preferable. In particular, spherical natural graphite produced by spheronization of flake graphite and granular artificial graphite are more preferable. Granular artificial graphite is most preferable.

The above particles may be covered with a carbonaceous substance, such as amorphous carbon or a graphitized substance. In the present invention, the above types of particles may be used alone or in combination of two or more types.

Examples of carbonaceous substance particles with a low degree of graphitization include carbonaceous particles prepared by baking an organic substance commonly at a temperature of less than 2500° C. Specific examples thereof include bulk mesophase and amorphous carbon. Examples of the organic substance include coal-derived heavy oils, such as coal tar pitch and a pyrolysis oil; straight-run heavy oils, such as atmospheric residue and vacuum residue; petroleum-derived heavy oils, such as a degradative heavy oil, such as ethylene tar, which is produced by the pyrolysis of crude oil, naphtha, or the like as a by-product; aromatic hydrocarbons, such as acenaphthylene, decacyclene, and anthracene; nitrogen-containing cyclic compounds, such as fenadine and acridine; sulfur-containing cyclic compounds, such as thiophene; aliphatic cyclic compounds, such as adamantane; and thermoplastic high-molecular weight compounds, such as polyphenylene (e.g., biphenyl or terphenyl), polyvinyl ester (e.g., polyvinyl chloride, polyvinyl acetate, or polyvinyl butyral), and polyvinyl alcohol.

Examples of the bulk mesophase include a carbonaceous substance produced by heating a petroleum-derived heavy oil, a coal-derived heavy oil, or a straight-run heavy oil at 400° C. to 600° C.

Examples of the amorphous carbon particles include amorphous carbon particles produced by baking bulk mesophase and amorphous carbon particles produced by rendering the organic substance infusible and then baking the organic substance.

As for the amorphous carbon, the baking temperature may be set to 600° C. or more in accordance with the degree of crystallinity. The baking temperature is preferably 900° C. or more and is more preferably 950° C. or more. The baking temperature is commonly less than 2500° C., is preferably 2000° C. or less, and is more preferably 1400° C. or less.

When baking is performed, an acid, such as phosphoric acid, boric acid, or hydrochloric acid, an alkali, such as sodium hydroxide, or the like may be mixed with the organic substance.

Examples of the artificial graphite include graphite materials produced by baking an organic substance, such as needle coke, pitch coke, coal tar, coal tar pitch, a coal-derived heavy oil, atmospheric residue, a petroleum-derived heavy oil, an aromatic hydrocarbon, a nitrogen-containing cyclic compound, a sulfur-containing cyclic compound, polyphenylene, polyvinyl chloride, polyvinyl alcohol, polyacrylonitrile, polyvinyl butyral, a naturally-occurring high-molecular weight compound, polyphenylene sulfide, polyphenylene oxide, a furfuryl alcohol resin, a phenol-formaldehyde resin, or an imide resin in order to perform graphitization. Among these, in order to produce a negative electrode material with which a battery having a large capacity may be prepared, a graphite material produced by baking needle green coke, coal tar, coal tar pitch, a coal-derived heavy oil, a petroleum-derived heavy oil, or an aromatic hydrocarbon in order to perform graphitization is preferable and a graphite material produced by baking needle green coke in order to perform graphitization is particularly preferable.

The graphitization temperature may be 2500° C. or more and 3200° C. or less. When graphitization is performed, a silicon-containing compound, a boron-containing compound, or the like may be used as a graphitization catalyst.

In order to further increase the capacity of the battery and further enhance the cycle characteristics of the battery, among artificial graphite materials, granular artificial graphite is more preferable. Granular artificial graphite particles that include graphite particles and amorphous carbon deposited on the surfaces are particularly preferable. The term "granular artificial graphite" used herein refers to artificial graphite particles formed as a result of primary particles of artificial graphite aggregating or combining with one another to form secondary particles.

The granular artificial graphite may be produced, for example, by adding a binder, such as coal tar, coal tar pitch, or a petroleum-derived heavy oil, to a precursor of artificial graphite, such as bulk mesophase or needle coke, forming the resulting mixture into a predetermined shape, and baking the mixture to perform graphitization. Optionally, granular artificial graphite covered with amorphous carbon may be produced by adding a precursor of amorphous carbon, such as coal tar, coal tar pitch, or a petroleum-derived heavy oil, to the resulting granular artificial graphite and baking the resulting mixture in an inert gas.

Composite artificial graphite covered with amorphous carbon may be produced by adding a precursor of amorphous carbon, such as coal tar, coal tar pitch, or a petroleum-derived heavy oil, to artificial graphite as a binder, granulating the resulting mixture, and baking the mixture in an inert gas.

Natural graphite is classified into flake graphite, crystalline graphite, vein graphite, and amorphous graphite on the basis of their properties (see the chapter "Graphite" of "Encyclopedia of powder process industry and technology" (published by Sangyo Gijyutsu Center K.K., Showa 49 (1974)) and "HANDBOOK OF CARBON, GRAPHITE, DIAMOND AND FULLERENES" (published by Noyes Publications)). Crystalline graphite and vein graphite have a highest degree of graphitization (100%). Flake graphite has the second highest degree of graphitization (99.9%). Graphite having a high degree of graphitization is suitable in the present invention. In particular, graphite that does not include a large amount of impurities is preferable. Various known refining treatments may be performed as needed.

Natural graphite is produced in Madagascar, China, Brazil, Ukraine, Canada, etc. Crystalline graphite is produced primarily in Sri Lanka. Amorphous graphite is produced primarily in the Korean Peninsula, China, Mexico, etc.

Examples of natural graphite include crystalline, flake, or vein natural graphite, high-purity flake graphite, and natural graphite subjected to a spheronization treatment (hereinafter, referred to as "spherical natural graphite"). In particular, in order to form suitable minute pores inside the carbon material and thereby enhance particle filling property and charge-discharge loading characteristics, spherical natural graphite is preferable, and spherical natural graphite produced by spheronization of flake graphite is most preferable.

The carbonaceous particles (A) according to the present invention may be particles produced by covering the natural graphite particles or the artificial graphite particles with amorphous carbon and/or a graphite substance having a low degree of graphitization. The carbonaceous particles (A) according to the present invention may include an oxide and another metal. Examples of the other metal include metals capable of forming an alloy with Li, such as Sn, Si, Al, and Bi.

The carbonaceous particles (A) according to the present invention may be produced by a conventional method. The carbonaceous particles (A) having a 10%-particle size displacement pressure of 10 MPa or less may be produced by selecting the type of the raw materials used and appropriately adjusting the amount of amorphous carbon and the like in the production of the carbonaceous particles (A) according to the present invention.

Preferable physical properties of the carbonaceous particles (A) according to the present invention are described below.

[Median Diameter (D50)]

The median diameter (D50) of the carbonaceous particles (A) according to the present invention is preferably 3 μm or more, is more preferably 4 μm or more, is further preferably 5 μm or more, is especially preferably 8 μm or more, is particularly preferably 10 μm or more, and further particularly preferably 12 μm or more, and is most preferably 17 μm or more.

The median diameter (D50) of the carbonaceous particles (A) is preferably 30 μm or less, is more preferably 28 μm or less, is further preferably 25 μm or less, is especially preferably 23 μm or less, is particularly preferably 20 μm or less, and is most preferably 17 μm or less.

When the D50 falls within the above range, an increase in irreversible capacity may be limited and the degradation of productivity, such as the formation of streaks in the slurry application, may be reduced.

If the D50 is excessively small, the irreversible capacity of a nonaqueous secondary battery produced using the carbonaceous particles (A) may be increased and the initial battery capacity of the battery may be reduced. If the D50 is excessively large, manufacturing troubles, such as the formation of streaks in the slurry application, the degradation of charge-discharge characteristics at high current densities, and the degradation of low-temperature output characteristics may occur.

The median diameters (D50) of the carbonaceous particles (A) according to the present invention and the silicon oxide particles (B) according to the present invention, which are described below, are the particle sizes at which the cumulative volume reaches 50% in a volume-basis particle size distribution curve drawn in ascending order in terms of particle size and determined by the method described in Examples below.

[Tap Density]

The tap density of the carbonaceous particles (A) according to the present invention is commonly 0.7 $g/cm^3$ or more, is preferably 0.75 $g/cm^3$ or more, is more preferably 0.8 $g/cm^3$ or more, is further preferably 0.83 $g/cm^3$ or more, is especially preferably 0.85 $g/cm^3$ or more, is particularly preferably 0.88 $g/cm^3$ or more, is further particularly preferably 0.9 $g/cm^3$ or more, and is most preferably 0.95 $g/cm^3$ or more; and is preferably 1.3 $g/cm^3$ or less, is more preferably 1.2 $g/cm^3$ or less, is further preferably 1.1 $g/cm^3$ or less, is especially preferably 1.08 $g/cm^3$ or less, is particularly preferably 1.05 g/cm³ or less, is further particularly preferably 1.0 g/cm³ or less, and is most preferably 0.98 g/cm³ or less.

When the tap density falls within the above range, productivity, such as formation of streaks in the preparation of electrode plates, may be enhanced and quick charge-discharge characteristics may be enhanced. Furthermore, an increase in the carbon density in particles is suppressed. This increases ease of rolling and makes it easy to form a high-density negative electrode sheet.

The tap density is defined as the density determined using a powder density gage by dropping the carbonaceous particles (A) according to the present invention into a cylindrical tap cell having a diameter of 1.6 cm and a volume of 20 cm³ through a sieve having an opening of 300 µm to fully fill the cell with the carbonaceous particles (A), tapping the cell 1000 times with a stroke length of 10 mm, and calculating the density of the sample from the volume and mass of the sample.

[BET Specific Surface Area (SA)]

The specific surface area (SA) of the carbonaceous particles (A) according to the present invention which is measured by the BET method is preferably 1 m²/g or more, is more preferably 1.2 m²/g or more, is further preferably 1.4 m²/g or more, is particularly preferably 2 m²/g or more, is further particularly preferably 3 m²/g or more, and is most preferably 4 m²/g or more; and is preferably 30 m²/g or less, is more preferably 25 m²/g or less, is further preferably 20 m²/g or less, is especially preferably 18 m²/g or less, is particularly preferably 17 m²/g or less, is further particularly preferably 15 m²/g or less, and is most preferably 5 m²/g or less.

When the above specific surface area falls within the above range, the portions through which Li enters and exits are maintained at a sufficient degree and a battery prepared using the negative electrode material may have excellent quick charge-discharge characteristics and excellent output characteristics. Furthermore, the reactivity of the active material toward an electrolyte solution may be limited to an adequate level. This prevents an increase in initial irreversible capacity and enables the production of a large-capacity battery. Moreover, an increase in the reactivity of a negative electrode prepared using the carbon material toward an electrolyte solution may be limited. This reduces gas generation and enables a preferable nonaqueous secondary battery to be provided.

The BET specific surface area may be determined by the method described in Examples below.

[Silicon Oxide Particles (B)]
<Physical Properties>
[Median Diameter (D50)]

The median diameter (D50) of the silicon oxide particles (B) according to the present invention, that is, the particle size (D50) at which the cumulative volume reaches 50% in a volume-basis particle size distribution curve drawn in ascending order in terms of particle size, is 0.8 µm or more and 20 µm or less. When the D50 of the silicon oxide particles (B) falls within the above range, the silicon oxide particles (B) are present in the gaps formed by the carbonaceous particles (A) after an electrode is formed. The gaps absorb changes in the volume of the silicon oxide particles (B) which occur upon the occlusion and release of alkali ions, such as a Li ion, during charging and discharging and reduce the disconnection of electrical conduction paths which may occur due to the volume change. As a result, cycle characteristics may be enhanced. The lower limit for the D50 of the silicon oxide particles (B) is more preferably 1 µm or more, is further preferably 2 µm or more, is particularly preferably 3 µm or more, and is most preferably 4 µm or more, while the upper limit is 15 µm or less, is further preferably 10 µm or less, is particularly preferably 8 µm or less, and is most preferably 7 µm or less.

[BET Specific Surface Area (SA)]

The upper limit for the BET specific surface area (SA) of the silicon oxide particles (B) according to the present invention is preferably 80 m²/g or less, is more preferably 60 m²/g or less, is further preferably 20 m²/g or less, is especially preferably 10 m²/g or less, is particularly preferably 8 m²/g or less, and is most preferably 6 m²/g or less, while the lower limit is preferably 0.5 m²/g or more, is more preferably 1 m²/g or more, is further preferably 1.2 m²/g or more, is especially preferably 1.5 m²/g or more, is particularly preferably 1.8 m²/g or more, and is most preferably 2.0 m²/g or more.

When the BET specific surface area of the silicon oxide particles (B) falls within the above range, the efficiency with which alkali ions, such as a Li ion, enter and exit may be maintained at a suitable level. Moreover, since the silicon oxide particles (B) have a suitable size, the silicon oxide particles (B) may be present in the gaps formed by the carbonaceous particles (A). This enables the electrical conduction paths between the carbonaceous particles (A) and the silicon oxide particles (B) to be maintained. In addition, since the silicon oxide particles (B) have a suitable size, an increase in irreversible capacity may be limited and a large battery capacity may be maintained.

The BET specific surface area may be determined by the method described in Examples below.

<Structure>

The silicon oxide particles (B) according to the present invention are preferably silicon oxide particles represented by general formula SiOx ($0.5 \leq x \leq 1.6$). The silicon oxide particles (B) according to the present invention preferably include crystalized silicon microcrystals. The microcrystals are commonly zero-valent silicon atoms.

The lower limit for x in general formula SiOx is more preferably 0.7 or more, is particularly preferably 0.8 or more, and is most preferably 0.9 or more, while the upper limit is more preferably 1.3 or less, is particularly preferably 1.2 or less, and is most preferably 1.1 or less. When x falls within the above range, particles composed of a highly reactive amorphous silicon oxide, through which alkali ions, such as a Li ion, readily enter and exit, increase battery capacity to a higher degree than the carbonaceous particles (A). In addition, the amorphous structure enables the production of a battery having a high cycle retention factor. Furthermore, filling the gaps formed by the carbonaceous particles (A) with the silicon oxide particles (B) while maintaining the contacts between the carbonaceous particles (A) and the silicon oxide particles (B) enables the gaps to absorb changes in the volume of the silicon oxide particles (B) which occur upon the occlusion and release of alkali ions, such as a Li ion, during charging and discharging. This may reduce the disconnection of electrical conduction paths which may occur due to the changes in the volume of the silicon oxide particles (B).

It is preferable that, in the solid-state NMR ($^{29}$Si-DD-MAS) measurement of the silicon oxide particles (B) according to the present invention, a broad peak (P2) having a center at −70 ppm, the vertex of the peak being at −65 to −85 ppm, be present in addition to a broad peak (P1) having a center around −110 ppm, the vertex of the peak being at −100 to −120 ppm, which is common in silicon oxide. The area ratio (P2)/(P1) between these peaks is preferably $0.1 \leq$ (P2)/(P1)≤1.0 and is more preferably 0.2≤(P2)/(P1)≤0.8. When the silicon oxide particles (B) according to the present invention have the above properties, a negative electrode material with which a battery having a large capacity and suitable cycle characteristics can be produced may be produced.

It is preferable that the silicon oxide particles (B) according to the present invention produce hydrogen when reacted with an alkali hydroxide. The lower limit for the content of zero-valent silicon atoms in the silicon oxide particles (B) which is calculated on the basis of the amount of hydrogen produced in the above reaction is preferably 2% by weight or more, is more preferably 5% by weight or more, and is further preferably 10% by weight or more, while the upper limit is preferably 45% by weight or less, is more preferably 36% by weight or less, and is further preferably 30% by weight or less. When the content of the zero-valent silicon atoms falls within the above range, a battery prepared using the negative electrode material may have a suitable charge-discharge capacity and suitable cycle characteristics.

The silicon oxide particles (B) which include silicon microcrystals preferably have the following properties.

i. In an X-ray diffraction (Cu—Kα) measurement using a copper anticathode, a diffraction peak having a center around 2θ=28.4° which corresponds to Si(111) is observed. The lower limit for the particle size of silicon crystals which is calculated using the Scherrer equation on the basis of the broadening of diffraction lines is preferably 1 nm or more, is more preferably 1.5 nm or more, and is further preferably 2 nm or more, while the upper limit is preferably 500 nm or less, is more preferably 200 nm or less, and is further preferably 20 nm or less. When the size of silicon microparticles falls within the above range, a suitable charge-discharge capacity may be achieved. Furthermore, the occurrence of excessive swelling and contraction during charging and discharging may be prevented and, consequently, cycle characteristics may be enhanced. The sizes of silicon microparticles may be measured using a transmission electron microscope image.

ii. In a spectrum obtained in the solid-state NMR ($^{29}$Si-DDMAS) measurement, a broad silicon dioxide peak having a center around −110 ppm is present. In addition, a peak unique to Si diamond crystals is present around −84 ppm. This spectrum is completely different from the spectra of common silicon oxides (SiOx: x=1.0+α); the structure of the silicon oxide particles (B) is clearly different from the structures of common silicon oxides. A transmission electron microscope observation confirms that silicon crystals are dispersed among amorphous silicon dioxide.

The lower limit for the content of the silicon microcrystals in the silicon oxide particles (B) is preferably 2% by weight or more, is more preferably 5% by weight or more, and is further preferably 10% by weight or more, while the upper limit is preferably 45% by weight or less, is more preferably 36% by weight or less, and is further preferably 30% by weight or less. When the content of the silicon microcrystals falls within the above range, a suitable charge-discharge capacity and suitable cycle characteristics may be achieved.

<Method for Producing Silicon Oxide Particles (B)>

The term "silicon oxide particles (B)" according to the present invention is a general term for particles of silicon oxide represented by SiOx, where x is 0<x<2, which is commonly produced using silicon dioxide ($SiO_2$) as a raw material by thermal reduction of $SiO_2$ with metal silicon (Si) and/or carbon (note that, as described below, doping may be performed using an element other than silicon or carbon. Although, in such a case, the composition formula differs from SiOx, particles of such a silicon oxide may be referred to as "silicon oxide particles (B)" used in the present invention). Since silicon (Si) has a larger theoretical capacity than graphite and alkali ions, such as a lithium ion, readily enter and exit the amorphous silicon oxide, a large battery capacity may be achieved. As described above, the silicon oxide particles (B) according to the present invention are preferably silicon oxide particles (B) represented by general formula SiOx, where x is 0.5 to 1.6.

The silicon oxide particles (B) according to the present invention may be hybrid silicon oxide particles that include silicon oxide particles as nuclei and a carbon layer composed of amorphous carbon which is disposed at least a part of the surfaces of the silicon oxide particles. Only one type of silicon oxide particles (B) selected from silicon oxide particles (B1) that do not include the carbon layer composed of amorphous carbon and the hybrid silicon oxide particles (B2) may be used alone. Alternatively, two or more types of silicon oxide particles (B) may be used in combination. The expression "carbon layer composed of amorphous carbon which is disposed at least a part of the surfaces of the silicon oxide particles" means not only that the carbon layer covers a part or the entirety of the surfaces of the silicon oxide particles in a layer form but also that the carbon layer is deposited or attached on a part or the entirety of the surfaces. The carbon layer may be arranged to cover over the entire surfaces, to cover only a part of the surfaces, or to be deposited or attached on only a part of the surfaces.

[Method for Producing Silicon Oxide Particles (B1)]

The method for producing the silicon oxide particles (B1) is not limited; it is possible to use any production method with which the silicon oxide particles (B1) that satisfy the characteristics required in the present invention can be produced. For example, silicon oxide particles produced by the method described in Japanese Patent No. 3952118 may be used. Specifically, a silicon dioxide powder is mixed with a metal silicon powder or a carbon powder at a specific ratio. The resulting mixture is charged into a reaction container. Subsequently, at normal pressure, or after the pressure has been reduced to a specific pressure, the temperature is increased to 1000° C. or more. Then, holding is performed to produce a SiOx gas. Subsequently, the temperature is reduced to perform precipitation. Hereby, silicon oxide particles represented by general formula SiOx (where x is 0.5≤x≤1.6) can be produced. The precipitate can be formed into particles by performing a mechanical energy treatment.

In a mechanical energy treatment, for example, the raw materials charged in the reaction container and a moving body that does not react with the raw materials are charged into a ball mill, a vibration ball mill, a planetary ball mill, a tumbling ball mill, or the like and a vibration, a rotation, or a combination thereof is applied to the mill. The silicon oxide particles (B) satisfying the above physical properties may be produced by the above method.

[Method for Producing Hybrid Silicon Oxide Particles (B2)]

The method for producing the hybrid silicon oxide particles (B2), which include silicon oxide particles and a carbon layer composed of amorphous carbon which is disposed on at least a part of the surfaces of the silicon oxide particles, is not limited. The hybrid silicon oxide particles (B2), which include silicon oxide particles and a carbon layer composed of amorphous carbon which is disposed on at least a part of the surfaces of the silicon oxide particles, may be produced by mixing the silicon oxide particles (B1) with petroleum-derived or coal-derived coal tar or pitch or a resin, such as polyvinyl alcohol, polyacrylonitrile, a phenolic resin, or cellulose using a solvent or the like as needed and baking the resulting mixture in a non-oxidizing atmosphere such that the lower limit for the baking temperature is commonly 500° C. or more, is preferably 700° C. or more, and is more preferably 800° C. or more, while the upper limit is commonly 3000° C. or less, is preferably 2000° C. or less, and is more preferably 1500° C. or less.

[Disproportionation Treatment]

The silicon oxide particles (B) according to the present invention may be produced by performing a disproportionation treatment, in which the silicon oxide particles (B1) or hybrid silicon oxide particles (B2) produced by the above-described method are further subjected to a heat treatment. Performing the disproportionation treatment enables the formation of a structure constituted by amorphous SiOx and zero-valent silicon atoms unevenly distributed in the amorphous SiOx in the form of Si microcrystals. The Si microcrystals included in the amorphous SiOx make the potential range in which the occlusion and release of Li ions occurs close to that of carbonaceous particles. This causes the changes in the volume of the silicon oxide particles (B) upon the occlusion and release of Li ions to occur simultaneously with the carbonaceous particles (A). This enables the relationship between the relative positions of the carbonaceous particles (A) and the silicon oxide particles (B) at the interfaces to be maintained and limits performance degradation due to the loss of contact between the carbonaceous particles and the silicon oxide particles.

The disproportionation treatment may be performed by heating the silicon oxide particles (B1) or the hybrid silicon oxide particles (B2) at 900° C. to 1400° C. in an inert gas atmosphere.

If the heat treatment temperature in the disproportionation treatment is less than 900° C., disproportionation does not occur at all or a considerably large amount of time may be required for forming the minute silicon cells (silicon microcrystals). That is, it is not efficient to set the heat treatment temperature to be less than 900° C. If the heat treatment temperature in the disproportionation treatment is more than 1400° C., the structuralization of silicon dioxide portions occurs, which blocks the migration of Li ions. Consequently, the performance of the lithium-ion secondary battery may become degraded. The lower limit for the heat treatment temperature in the disproportionation treatment is preferably 1000° C. or more and is more preferably 1100° C. or more, while the upper limit is preferably 1300° C. or less and is more preferably 1250° C. or less. The amount of time during which the disproportionation treatment is performed (disproportionation time) may be adjusted within the range of about 10 minutes to 20 hours and particularly within the range of about 30 minutes to 12 hours, appropriately in accordance with the temperature at which the disproportionation treatment is performed. For example, when the disproportionation treatment temperature is 1100° C., the disproportionation time is suitably about 5 hours.

The disproportionation treatment is not limited. The disproportionation treatment may be performed in an inert gas atmosphere with a reaction apparatus equipped with a heating mechanism. The disproportionation treatment may be performed in a batch or continuous process. Specifically, the reaction apparatus may be selected from a fluidized-bed reactor, a rotary furnace, a vertical moving-bed reactor, a tunnel furnace, a batch furnace, a rotary kiln, and the like appropriately in accordance with the purpose. In this case, as a (treatment) gas, a gas inactive at the above treatment temperature, such as Ar, He, $H_2$, or $N_2$, may be used alone. Alternatively, a mixed gas thereof may also be used.

<Doping of Silicon Oxide Particles (B) with Another Element>

The silicon oxide particles (B) may be doped with an element other than silicon or oxygen. The silicon oxide particles (B) doped with an element other than silicon or oxygen may increase initial charge-discharge efficiency and enhance cycle characteristics because the chemical structure inside the particles becomes stabilized. In addition, since the lithium ion acceptability of the silicon oxide particles (B) becomes enhanced and close to the lithium ion acceptability of the carbonaceous particles (A), using a negative electrode material including both carbonaceous particles (A) and silicon oxide particles (B) eliminates the risk of lithium ions being excessively concentrated in the negative electrode even during quick charging and enables the preparation of a battery in which the precipitation of metal lithium is reduced.

The element used for doping is commonly selected from elements other than Group 18 elements of the Periodic Table. In order to maintain the silicon oxide particles (B) doped with an element other than silicon or oxygen to be further stable, elements in Period 4 or less of the Periodic Table are preferable. Specifically, the element used for doping may be selected from the alkali metals and alkaline-earth metals in Period 4 or less of the Periodic Table, Al, Ga, Ge, N, P, As, Se, etc. In order to enhance the lithium ion acceptability of the silicon oxide particles (B) doped with an element other than silicon or oxygen, the element used for doping is preferably an alkali metal or alkaline-earth metal in Period 4 or less of the Periodic Table, is more preferably Mg, Ca, or Li, and is further preferably Li. The above elements may be used alone or in combination of two or more.

The ratio of the number ($M_D$) of atoms of the element used for doping to the number ($M_{Si}$) of silicon atoms in the silicon oxide particles (B) doped with an element other than silicon or oxygen, that is, $M_D/M_{Si}$, is preferably 0.01 to 5, is more preferably 0.05 to 4, and is further preferably 0.1 to 3. If the $M_D/M_{Si}$ is below the range, the advantageous effects of doping the silicon oxide particles (B) with an element other than silicon or oxygen are not produced. If the $M_D/M_{Si}$ is above the range, some of the atoms of the element other than silicon or oxygen which have not been used in the doping reaction may remain on the surfaces of the silicon oxide particles and reduce the capacity of the silicon oxide particles.

The silicon oxide particles (B) doped with an element other than silicon or oxygen may be produced, for example, by mixing the silicon oxide particles with a powder of a simple substance or compound of the element used for doping and heating the resulting mixture at 50° C. to 1200° C. in an inert gas atmosphere. Alternatively, silicon oxide particles doped with an element other than silicon or oxygen may be produced, for example, by mixing a silicon dioxide powder with a metal silicon powder or a carbon powder at a specific ratio, adding a powder of a simple substance or compound of the element used for doping to the resulting mixture, charging the mixture into a reaction container, subsequently, at normal pressure or after the pressure has been reduced to a specific pressure, increasing the temperature to 1000° C. or more, then performing holding to produce a gas, and cooling the gas to perform precipitation.

Although the negative electrode material according to the present invention may be any negative electrode material that includes both carbonaceous particles (A) and silicon oxide particles (B), it is preferable that the silicon oxide particles (B) be not included in graphite. In such a case, the above-described mechanisms according to the present invention may be utilized with further effect and the advantageous effects may be further increased.

[Negative Electrode Material]

<Proportions of Carbonaceous Particles (A) and Silicon Oxide Particles (B)>

In the negative electrode material according to the present invention, it is preferable that the content of the silicon oxide particles (B) according to the present invention be less than 30% by weight of the total content of the carbonaceous particles (A) according to the present invention and the silicon oxide particles (B) and that the content of the carbonaceous particles (A) be more than 70% by weight of the total content of the carbonaceous particles (A) and the silicon oxide particles (B). The lower limit for the ratio of the content of the silicon oxide particles (B) to the total content of the carbonaceous particles (A) and the silicon oxide particles (B) is more preferably 1% by weight or more, is further preferably 2% by weight or more, is particularly preferably 5% by weight or more, and is most preferably 8% by weight or more, while the upper limit is more preferably 20% by weight or less, is further preferably 18% by weight or less, is particularly preferably 15% by weight or less, and is most preferably 12% by weight or less. Using the carbonaceous particles (A) and the silicon oxide particles (B) in a mixture at the above proportions allows the silicon oxide particles (B), which have a large capacity and a small volume change due to the occlusion and release of Li ions, to be present in the gaps formed by the carbonaceous particles (A). This enables the production of a large-capacity negative electrode material having a low risk of performance degradation due to the loss of contact between the carbonaceous particles (A) and the silicon oxide particles (B).

In the negative electrode material according to the present invention, as the carbonaceous particles (A), plural types of carbonaceous particles having different 10%-particle size displacement pressures may be used in combination. Carbonaceous particles that do not correspond to the carbonaceous particles (A) and silicon oxide particles that do not correspond to the silicon oxide particles (B) may be used in combination such that the advantageous effects of the present invention are not impaired.

{Negative Electrode for Nonaqueous Secondary Batteries}

A negative electrode for nonaqueous secondary batteries according to the present invention (hereinafter, may be referred to as "negative electrode according to the present invention") includes a current collector and an active material layer disposed on the current collector. The active material layer includes the negative electrode material according to the present invention.

The negative electrode may be prepared using the negative electrode material according to the present invention by mixing the negative electrode material with a binder resin, adding the resulting mixture to an aqueous or organic medium to form a slurry, applying the slurry to a current collector after adding a thickener to the slurry as needed, and drying the slurry deposited on the current collector.

The binder resin is preferably stable in a nonaqueous electrolyte solution and insoluble in water. Examples of the binder resin include rubber-like high-molecular weight compounds, such as a styrene-butadiene rubber, an isoprene rubber, and an ethylene-propylene rubber; synthetic resins, such as polyethylene, polypropylene, polyethylene terephthalate, polyimide, polyacrylic acid, and aromatic polyamide; thermoplastic elastomers, such as a styrene-butadiene-styrene block copolymer, and hydrogenated products thereof, a styrene-ethylene-butadiene-styrene copolymer, styrene-isoprene, a styrenic block copolymer, and hydrides thereof; soft resin-like high-molecular weight compounds, such as syndiotactic-1,2-polybutadiene, an ethylene-vinyl acetate copolymer, and a copolymer of ethylene with an α-olefin having 3 to 12 carbon atoms; and fluorinated high-molecular weight compounds, such as a polytetrafluoroethylene-ethylene copolymer, polyvinylidene fluoride, polypentafluoropropylene, and polyhexafluoropropylene. Examples of the organic medium include N-methylpyrrolidone and dimethylformamide.

The amount of the binder resin used relative to 100 parts by weight of the negative electrode material is commonly 0.1 parts by weight or more and is preferably 0.2 parts by weight or more. Limiting the amount of the binder resin used relative to 100 parts by weight of the negative electrode material to be 0.1 parts by weight or more increases the binding force among the particles of the negative electrode material and the binding force between the negative electrode material and the current collector to a sufficient level and consequently limits a reduction in the battery capacity and the degradation of cycle characteristics which may occur when the negative electrode material becomes detached from the negative electrode.

The amount of the binder resin used relative to 100 parts by weight of the negative electrode material is preferably 10 parts by weight or less and is more preferably 7 parts by weight or less. Limiting the amount of the binder resin used relative to 100 parts by weight of the negative electrode material to be 10 parts by weight or less limits a reduction in the capacity of the negative electrode and prevents troubles, such as the hindrance of entry and exit of alkali ions, such as lithium ions, to and from the negative electrode material.

Examples of the thickener added to the slurry include water-soluble celluloses, such as carboxymethyl cellulose, methyl cellulose, hydroxyethyl cellulose, and hydroxypropyl cellulose, polyvinyl alcohol, and polyethylene glycol. Among these, carboxymethyl cellulose is preferable. It is preferable to use the thickener such that the minimum content is commonly 0.1 parts by weight or more and is particularly 0.2 parts by weight or more and the maximum content is commonly 10 parts by weight or less and is particularly 7 parts by weight or less, relative to 100 parts by weight of the negative electrode material.

Examples of the negative electrode current collector include copper, copper alloy, stainless steel, nickel, titanium, and carbon, which are known as a material for negative electrode current collectors in the related art. The shape of the current collector is commonly sheet-like. Alternatively, a sheet-like current collector having irregularities formed in the surface, a net-like current collector, a current collector composed of perforated metal, and the like are also preferably used.

It is preferable to perform pressurization after the slurry of the negative electrode material and the binder resin has been applied to the current collector and dried in order to increase the density of the active material layer formed on the current collector and the battery capacity per unit volume of the negative electrode active material layer. The lower limit for the density of the active material layer is preferably 1.2 g/cm$^3$ or more and is more preferably 1.3 g/cm$^3$ or more, while the upper limit is preferably 1.8 g/cm$^3$ or less and is more preferably 1.6 g/cm$^3$ or less.

Setting the density of the active material layer to 1.2 g/cm$^3$ or more limits a reduction in the battery capacity which occurs when the electrode thickness is increased. Setting the density of the active material layer to 1.8 g/cm$^3$ or less reduces the likelihood of the mobility of alkali ions, such as lithium ions, being reduced as a result of the amount of the electrolyte solution retained in the gaps created between the particles inside the electrode being reduced due to a reduction in the amount of gaps and thereby limits the degradation of quick charge-discharge properties.

The negative electrode active material layer is preferably constituted by the carbonaceous particles (A) and the silicon oxide particles (B) present in the gaps formed by the carbonaceous particles (A). When the silicon oxide particles (B) are present in the gaps formed by the carbonaceous particles (A), capacity may be increased and rate characteristics may be enhanced.

The pore capacity of the negative electrode active material layer formed using the negative electrode material according to the present invention which is measured by a mercury intrusion method in a range of 10 to 100000 nm is preferably 0.05 ml/g or more and is more preferably 0.1 ml/g or more. Setting the above pore capacity to be 0.05 ml/g or more increases the area of the portions through which alkali ions, such as lithium ions, enter and exit.

{Nonaqueous Secondary Battery}

A nonaqueous secondary battery according to the present invention is a nonaqueous secondary battery that includes a positive and negative electrodes and an electrolyte. The negative electrode is the negative electrode according to the present invention.

The nonaqueous secondary battery according to the present invention may be produced by a conventional method, except that the above-described negative electrode according to the present invention is used.

[Positive Electrode]

Examples of a positive electrode material that serves as a positive electrode active material included in the nonaqueous secondary battery according to the present invention include lithium transition metal composite oxides, such as a lithium cobalt composite oxide having a fundamental composition represented by $LiCoO_2$, a lithium nickel composite oxide having a fundamental composition represented by $LiNiO_2$, and a lithium manganese composite oxide having a fundamental composition represented by $LiMnO_2$ or $LiMn_2O_4$; transition metal oxides, such as manganese dioxide; and mixtures of the above composite oxides. $TiS_2$, $FeS_2$, $Nb_3S_4$, $Mo_3S_4$, $CoS_2$, $V_2O_5$, $CrO_3$, $V_3O_3$, $FeO_2$, $GeO_2$, and $LiNi_{0.33}Mn_{0.33}Co_{0.33}O_2$, $LiFePO_4$, and the like may also be used.

The positive electrode may be produced by mixing the positive electrode material with a binder resin, adding the resulting mixture to an appropriate solvent to form a slurry, applying the slurry to a current collector, and drying the slurry deposited on the current collector. It is preferable to add a conductive agent, such as acetylene black or Ketjenblack, to the slurry. A thickener may optionally be added to the slurry as needed.

The thickener and the binder resin may be selected from the thickeners and the binder resins known as those used in this application, such as the above-described examples of the thickener and binder resin used in the production of the negative electrode. The lower limit for the amount of the conductant agent used relative to 100 parts by weight of the positive electrode material is preferably 0.5 parts by weight or more and is particularly preferably 1 part by weight or more, while the upper limit is preferably 20 parts by weight or less and is particularly preferably 15 parts by weight or less. The lower limit for the amount of the thickener used relative to 100 parts by weight of the positive electrode material is preferably 0.2 parts by weight or more and is particularly preferably 0.5 parts by weight or more, while the upper limit is preferably 10 parts by weight or less and is particularly preferably 7 parts by weight or less.

In the case where the slurry is formed by adding the binder resin to water, the lower limit for the amount of the binder resin used relative to 100 parts by weight of the positive electrode material is preferably 0.2 parts by weight or more and is particularly preferably 0.5 parts by weight or more, while the upper limit is preferably 10 parts by weight or less and is particularly preferably 7 parts by weight or less. In the case where the slurry is formed by adding the binder resin to an organic solvent capable of dissolving the binder resin, such as N-methylpyrrolidone, the above lower limit is preferably 0.5 parts by weight or more and is particularly preferably 1 part by weight or more, while the upper limit is preferably 20 parts by weight or less and is particularly preferably 15 parts by weight or less.

Examples of the material for the positive electrode current collector include aluminum, titanium, zirconium, hafnium, niobium, tantalum, and alloys thereof. Among these, aluminum, titanium, tantalum, and alloys thereof are preferable. Aluminum and alloys thereof are most preferable.

[Electrolyte Solution]

The electrolyte solution may be an electrolyte solution prepared by dissolving an appropriate lithium salt in a known nonaqueous solvent.

Examples of the nonaqueous solvent include cyclic carbonates, such as ethylene carbonate, fluoroethylene carbonate, propylene carbonate, butylene carbonate, and vinylene carbonate; chain carbonates, such as dimethyl carbonate, ethylmethyl carbonate, and diethyl carbonate; cyclic esters, such as γ-butyrolactone; cyclic ethers, such as crown ether, 2-methyltetrahydrofuran, tetrahydrofuran, 1,2-dimethyltetrahydrofuran, and 1,3-dioxolane; and chain ethers, such as 1,2-dimethoxyethane. The above nonaqueous solvents are commonly used in a mixture of two or more. In particular, it is preferable to use a mixture of a cyclic carbonate with a chain carbonate or a mixture of a cyclic carbonate and a chain carbonate with another solvent.

Compounds, such as vinylene carbonate, vinyl ethylene carbonate, succinic anhydride, maleic anhydride, propane sultone, and diethyl sulfone; difluorophosphates, such as lithium difluorophosphate; and the like may be added to the electrolyte solution. An anti-overcharging agent, such as diphenyl ether or cyclohexylbenzene, may be added to the electrolyte solution.

Examples of an electrolyte dissolved in the nonaqueous solvent include $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$, and $LiC(CF_3SO_2)_3$. The lower limit for the concentration of the electrolyte in the electrolyte solution is commonly 0.5 mol/L or more and is preferably 0.6 mol/L or more, while the upper limit is commonly 2 mol/L or less and is preferably 1.5 mol/L or less.

[Separator]

The separator interposed between the positive and negative electrodes is preferably a porous sheet or nonwoven fabric made of a polyolefin, such as polyethylene or polypropylene.

[Negative Electrode/Positive Electrode Capacity Ratio]

It is more preferable that the nonaqueous secondary battery according to the present invention be designed such that the capacity ratio of the negative electrode to the positive electrode is 1.01 or more, is particularly 1.2 or more and 1.5 or less, and is particularly 1.4 or less.

The nonaqueous secondary battery according to the present invention is preferably a lithium-ion secondary battery that includes positive and negative electrodes capable of occluding and releasing Li ions and an electrolyte.

EXAMPLES

The contents of the present invention are described more specifically with reference to Examples below. The present invention is not limited by Examples below without departing from the scope of the invention. The values described in the manufacturing conditions and evaluation results in Examples below mean the maximum and minimum preferable values in the embodiment of the present invention. A preferable range may be defined by the above-described upper or lower limit and a value described in Examples below or by the values described in Examples.

{Methods for Measuring and Evaluating Physical Properties and Characteristics}

[Measurement of Carbonaceous Particles (A) and Silicon Oxide Particles (B)]

<10%-Particle Size Displacement Pressure of Carbonaceous Particles (A)>

The measurement was conducted using a micro-compression testing machine (produced by Shimadzu Corporation).

A sample was placed on a sample stage. A carbonaceous particle that was to be measured was randomly selected using a microscope attached to the machine. The average diameter of the particle that was to be measured was calculated as the average of the maximum diameter of the particle which was measured when the particle was viewed in plan with the microscope and the local maximum diameter of the particle which was measured in a direction orthogonal to the axis along which the maximum diameter occurred. Subsequently, a compression test was conducted with a maximum testing force of 490 mN and a loading rate of 4.8 mN/sec. A testing force at which the displacement (deformation) of the particle reached 10% of the average diameter was substituted into Formula (1) below in order to calculate a 10%-particle size displacement pressure. Four or more carbonaceous particles were subjected to the above measurement. The average of measurement results of the bottom 50% of a distribution of the 10%-particle size displacement pressure was considered a 10%-particle size displacement pressure of the sample.

{10%-Particle size displacement pressure}=2.48× {Testing force [N]}/(π×{Average diameter [μm]}×{Average diameter [μm]})　　　Formula (1)

<Median Diameter (D50)>

The volume-basis median diameter (D50) was determined by dispersing a sample in a 0.2-weight% aqueous solution (about 10 mL) of polyoxyethylene (20) sorbitan monolaurate used as a surfactant and using a laser diffraction/scattering particle size distribution analyzer "LA-700" (produced by HORIBA, Ltd.).

<Tap Density>

The tap density was measured using a powder density gage "Tap Denser KYT-3000" (produced by SEISHIN ENTERPRISE Co., Ltd.). Specifically, a sample was dropped into a 20-cc tap cell. After the cell had been fully filled with the sample, it was tapped 1000 times with a stroke length of 10 mm. Then, the density of the sample was measured and referred to as "tap density".

<BET Specific Surface Area (SA)>

The BET specific surface area was measured using "TriStar II 3000" produced by Micromeritics Instrument Corporation. After a sample had been dried at 150° C. for 1 hour under reduced pressure, measurement was conducted by a multipoint BET method using adsorption of nitrogen gas (5 points within a relative pressure range of 0.05 to 0.30).

[Battery Evaluations]

<Preparation of Nonaqueous Secondary Battery (Coin-Shaped Battery) for Performance Evaluations>

With 97.5% by weight of the mixture of the carbonaceous particles (A) and the silicon oxide particles (B) which is described below, 3.1% by weight of an aqueous dispersion containing 48% by weight of a styrene-butadiene rubber (SBR), 97.5% by weight of an aqueous solution containing 1% by weight of carboxymethyl cellulose (CMC), which served as a binder, was mixed. The resulting mixture was kneaded with a hybridization mixer to form a slurry. The slurry was applied to a rolled copper foil having a thickness of 10 μm by a blade method at a basis weight of 2 to 10 mg/cm$^2$.

Subsequently, roll pressing was performed such that the density of the resulting negative electrode active material layer was 1.0 to 1.6 g/cm$^3$. Hereby, a negative electrode sheet was prepared.

The negative electrode sheet was stamped into a disc-like shape having a diameter of 12.5 mm. A lithium metal foil was stamped into a disc-like shape having a diameter of 14 mm to prepare a counter electrode. A separator (made of a porous polyethylene film) impregnated with an electrolyte solution prepared by dissolving LiPF$_6$ in a mixed solvent of ethylene carbonate and ethyl methyl carbonate (volume ratio =3:7) such that the concentration of LiPF$_6$ in the electrolyte solution was 1 mol/L was interposed between the two electrodes. Hereby, a coin-shaped battery was prepared.

<Measurement of Discharge Capacity and Cycle Retention Factor>

Using the nonaqueous secondary battery (coin-shaped battery) prepared by the above-described method, the discharge capacity (mAh/g) of the battery during charging and discharging was measured by the following method.

The battery was charged to 5 mV versus the lithium counter electrode at a current density of 0.05C. The battery was further charged at a constant voltage of 5 mV until the current density reached 0.005C. After the negative electrode had been doped with lithium, the battery was discharged to 1.5 V versus the lithium counter electrode at a current density of 0.1C.

The charge capacity and discharge capacity of the battery were determined as follows. The weight of the negative electrode active material was calculated by subtracting the weight of a copper foil having the same area as the negative electrode from the weight of the negative electrode. The charge capacity and discharge capacity per weight were calculated by dividing the charge capacity and discharge capacity measured in the first cycle by the weight of the negative electrode active material.

The above charge capacity (mAh/g) was considered the 1st charge capacity (mAh/g) of the negative electrode material, while the above discharge capacity (mAh/g) was considered the 1st discharge capacity (mAh/g) of the negative electrode material. The 1st discharge capacity was considered the initial capacity.

An evaluation of "Pass" was given when the initial capacity was 400 mAh/g or more. An evaluation of "Good" was given when the initial capacity was 415 mAh/g or more.

The value calculated by dividing the discharge capacity (mAh/g) measured in the first cycle by the charge capacity (mAh/g) and multiplying the quotient by 100 was considered the 1st efficiency (%).

The value calculated by dividing the 2nd discharge capacity by the sum of the 1st charge capacity and the 2nd irreversible capacity and multiplying the quotient by 100 was considered the 2nd efficiency.

The value calculated by dividing the 3rd discharge capacity by the sum of the 1st charge capacity, the 2nd irreversible capacity, and the 3rd irreversible capacity and multiplying the quotient by 100 was considered the 3rd efficiency.

The above operation cycle was repeated 10 times. The value calculated by dividing the discharge capacity measured in the 10th cycle by the discharge capacity measured in the 1st cycle and multiplying the quotient by 100 was considered a cycle retention factor.

An evaluation of "Pass" was given when the cycle retention factor was 30% or more. An evaluation of "Good" was given when the cycle retention factor was 60% or more.

<Total Evaluation>

A total evaluation of "Pass" was given to a sample that was evaluated as "Pass" in terms of both initial capacity and cycle retention factor. In particular, a total evaluation of "Good" was given to a sample that was evaluated as "Good" in terms of either initial capacity or cycle retention factor. Furthermore, a total evaluation of "Excellent" was given to a sample that was evaluated as "Good" in terms of both initial capacity and cycle retention factor. A total evaluation of "Fail" was given to a sample that was not evaluated as "Pass" in terms of either initial capacity or cycle retention factor.

[Carbonaceous Particles (A)]
<Carbonaceous Particles (A1)>

Spherical natural graphite particles having a volume-basis average particle diameter D50 of 16.3 μm, a BET specific surface area (SA) of 6.8 m$^2$/g, and a tap density of 0.99 g/cm$^3$ were used as carbonaceous particles (A1).

Table 1 describes the 10%-particle size displacement pressure of the carbonaceous particles (A1).

<Carbonaceous Particles (A2)>

Flake natural graphite particles having a D50 of 100 μm were pulverized with a dry swirling flow pulverizer to form flake natural graphite particles having a D50 of 8.1 μm, a tap density of 0.39 g/cm$^3$, and a moisture content of 0.08% by weight. To 100 g of the flake natural graphite particles, 12 g of a paraffin oil (liquid paraffin, produced by Wako Pure Chemical Industries, Ltd., first-class, physical properties at 25° C.: viscosity: 95 cP, contact angle: 13.2°, surface tension: 317 mN/m, and rCOSθ: 30.9) used as a granulating agent was added. The resulting mixture was stirred. The resulting sample was disintegrated and stirred with a hammer mill ("MF10" produced by IKA) at a rotational speed of 3000 rpm. Hereby, flake natural graphite on which the granulating agent was uniformly deposited was prepared. The flake natural graphite on which the granulating agent was uniformly deposited was subjected to a granulation-spheronization treatment using a mechanical action with Hybridization System NHS-1 produced by Nara Machinery Co., Ltd. at a rotor circumferential velocity of 85 m/sec for 10 minutes. A heat treatment was performed in an inert gas at 720° C. Hereby, carbonaceous particles (A2) of spherical graphite were prepared.

Table 1 describes the physical properties of the carbonaceous particles (A2).

<Carbonaceous Particles (A3)>

Needle green coke was finely pulverized to form a needle green coke powder having a d50 of 10.9 μm. The powder was baked in an electric furnace by heating from room temperature to 1000° C. and subsequently graphitized at 3000° C. The resulting graphite powder was mixed with a petroleum-derived heavy oil produced by the pyrolysis of naphtha, which was used as a precursor of amorphous carbon. After the resulting mixture had been heated in an inert gas at 1300° C., the baked product was disintegrated and classified. Hereby, particles of granular artificial graphite (A3), which included graphite particles and amorphous carbon deposited on the surfaces of the graphite particles, were prepared. It was confirmed on the basis of bake yield that the carbonaceous particles (A3) were covered with 4 parts by mass of amorphous carbon relative to 100 parts by mass of graphite.

Table 1 describes the physical properties of the carbonaceous particles (A3).

<Carbonaceous Particles (a1)>

Spherical natural graphite particles having a D50 of 16.3 μm, a BET specific surface area (SA) of 6.8 m$^2$/g, and a tap density of 0.99 g/cm$^3$ were mixed with a petroleum-derived heavy oil produced by the pyrolysis of naphtha, which was used as a precursor of amorphous carbon. After the resulting mixture had been heated in an inert gas at 1300° C., the baked product was pulverized and classified. Hereby, carbonaceous particles (a1) of a multilayer structure carbon material, which included graphite particles and amorphous carbon deposited on the surfaces of the graphite particles, were prepared. It was confirmed on the basis of bake yield that the multilayer structure carbon material was covered with 3 parts by mass of amorphous carbon relative to 100 parts by mass of graphite.

Table 1 describes the physical properties of the carbonaceous particles (a1).

<Carbonaceous Particles (a2)>

Artificial graphite particles that were commercial mesocarbon microbeads (hereinafter, abbreviated as "MCMB") were used as carbonaceous particles (a2).

Table 1 describes the physical properties of the carbonaceous particles (a2).

TABLE 1

| | D50 (μm) | SA (m$^2$/g) | Tap density (g/cm$^3$) | 10%-Particle size displacement pressure (MPa) |
|---|---|---|---|---|
| Carbonaceous particles (A1) | 16.3 | 6.8 | 0.99 | 3.2 |
| Carbonaceous particles (A2) | 11.6 | 15.3 | 0.88 | 8.9 |
| Carbonaceous particles (A3) | 20.1 | 1.5 | 0.95 | 2.5 |
| Carbonaceous particles (a1) | 15.5 | 3.2 | 1.14 | 10.5 |
| Carbonaceous particles (a2) | 18.4 | 1.2 | 1.49 | 45.7 |

[Silicon Oxide Particles (B)]
<Silicon Oxide Particles (B1)>

Commercial SiO particles (SiOx, where x=1) were used as silicon oxide particles (B1). Table 2 describes the D50 and BET specific surface area (SA) of the silicon oxide particles (B1).

<Silicon Oxide Particles (b1)>

Commercial SiO particles (SiOx, where x=1) were used as silicon oxide particles (b1). Table 2 describes the D50 and BET specific surface area (SA) of the silicon oxide particles (b1).

TABLE 2

| | D50 (μm) | SA (m$^2$/g) |
|---|---|---|
| Silicon oxide particles (B1) | 5.6 | 3.5 |
| Silicon oxide particles (b1) | 0.48 | 26 |

EXAMPLES AND COMPARATIVE EXAMPLES

Example 1

With 90 parts by weight of the carbonaceous particles (A1), 10 parts by weight of the silicon oxide particles (B1) were mixed by a dry process to prepare a mixture. A nonaqueous secondary battery (coin-shaped battery) for performance evaluations was prepared using the mixture by the above-described method. The initial capacity and cycle retention factor of the battery were measured by the above-described measuring methods. Table 3 describes the results.

Example 2

With 90 parts by weight of the carbonaceous particles (A2), 10 parts by weight of the silicon oxide particles (B1) were mixed by a dry process to prepare a mixture. The measurements were conducted using the mixture as in Example 1. Table 3 describes the results.

Example 3

With 90 parts by weight of the carbonaceous particles (A3), 10 parts by weight of the silicon oxide particles (B1) were mixed by a dry process to prepare a mixture. The measurements were conducted using the mixture as in Example 1. Table 3 describes the results.

Comparative Example 1

With 90 parts by weight of the carbonaceous particles (a1), 10 parts by weight of the silicon oxide particles (B1) were mixed by a dry process to prepare a mixture. The measurements were conducted using the mixture as in Example 1. Table 3 describes the results.

Comparative Example 2

With 90 parts by weight of the carbonaceous particles (a2), 10 parts by weight of the silicon oxide particles (B1) were mixed by a dry process to prepare a mixture. The measurements were conducted using the mixture as in Example 1. Table 3 describes the results.

Comparative Example 3

With 90 parts by weight of the carbonaceous particles (A1), 10 parts by weight of the silicon oxide particles (b1) were mixed by a dry process to prepare a mixture. The measurements were conducted using the mixture as in Example 1. Table 3 describes the results.

TABLE 3

| | Carbonaceous particles | Silicon oxide particles | Initial capacity (mAh/g) | Cycle retention factor (%) | Total evaluation |
|---|---|---|---|---|---|
| Example 1 | A1 | B1 | 413 | 37 | Pass |
| Example 2 | A2 | B1 | 413 | 83 | Good |
| Example 3 | A3 | B1 | 420 | 71 | Excellent |
| Comparative example 1 | a1 | B1 | 401 | 13 | Fail |
| Comparative example 2 | a2 | B1 | 373 | 25 | Fail |
| Comparative example 3 | A1 | b1 | 294 | 8 | Fail |

The above-described results confirm that a negative electrode material capable of increasing capacity and enhancing cycle characteristics in a balanced manner may be produced by using, as a negative electrode material, the carbonaceous particles (A) having a 10%-particle size displacement pressure of 10 MPa or less in combination with the silicon oxide particles (B) having a median diameter (D50) of 0.8 μm or more and 20 μm or less. In particular, in Example 3, where artificial graphite particles were used as carbonaceous particles (A), the initial capacity was markedly large. This confirms that a large-capacity negative electrode material was prepared.

Although the present invention has been described in detail with reference to specific embodiments, it is apparent to a person skilled in the art that various alterations and modifications can be made therein without departing from the spirit and scope of the present invention.

The present application is based on Japanese Patent Application No. 2018-098022 filed on May 22, 2018, which is incorporated herein by reference in its entirety.

The invention claimed is:

1. A negative electrode material for nonaqueous secondary batteries, comprising
   carbonaceous particles (A) having a 10%-particle size displacement pressure of 2.5 to 10 MPa, the 10%-particle size displacement pressure as measured using a micro-compression testing machine; and
   silicon oxide particles (B), having a median diameter (D50) of 0.8 μm or more and 20 μm or less.

2. The negative electrode material for nonaqueous secondary batteries according to claim 1, the negative electrode material including artificial graphite as the carbonaceous particles (A).

3. The negative electrode material for nonaqueous secondary batteries according to claim 1, the negative electrode material including granular artificial graphite as the carbonaceous particles (A).

4. The negative electrode material for nonaqueous secondary batteries according to any one of claims 1 to 3, wherein a content of the silicon oxide particles (B) is less than 30% by weight of a total content of the carbonaceous particles (A) and the silicon oxide particles (B).

5. The negative electrode material for nonaqueous secondary batteries according to any one of claims 1 to 4, wherein the carbonaceous particles (A) are graphite particles.

6. The negative electrode material for nonaqueous secondary batteries according to any one of claims 1 to 5, wherein the silicon oxide particles (B) have a structure including a microcrystal of silicon.

7. The negative electrode material for nonaqueous secondary batteries according to any one of claims 1 to 6, wherein the silicon oxide particles (B) are represented by general formula SiOx where $0.5 \leq x \leq 1.6$.

8. The negative electrode material for nonaqueous secondary batteries according to any one of claims 1 to 7, wherein the silicon oxide particles (B) and the carbonaceous particles (A) are present as independent particles.

9. A negative electrode for nonaqueous secondary batteries, the negative electrode comprising a current collector and an active material layer disposed on the current collector, the active material layer including the negative electrode material according to any one of claims 1 to 8.

10. A nonaqueous secondary battery comprising a positive electrode, a negative electrode, and an electrolyte, the negative electrode being the negative electrode for nonaqueous secondary batteries according to claim 9.

\* \* \* \* \*